(12) United States Patent
Grüneklee et al.

(10) Patent No.: US 7,690,721 B2
(45) Date of Patent: Apr. 6, 2010

(54) JUNCTION STRUCTURE FOR CONNECTING TWO PROFILES IN A VEHICLE SUPPORT FRAME

(75) Inventors: Axel Grüneklee, Duisburg (DE); Lothar Patberg, Aachen (DE)

(73) Assignee: ThyssenKrupp Steel Europe AG, Duisburg (DE)

( * ) Notice: Subject to any disclaimer, the term of this patent is extended or adjusted under 35 U.S.C. 154(b) by 652 days.

(21) Appl. No.: 10/568,404

(22) PCT Filed: Aug. 4, 2004

(86) PCT No.: PCT/EP2004/008725

§ 371 (c)(1),
(2), (4) Date: Aug. 14, 2006

(87) PCT Pub. No.: WO2005/019015

PCT Pub. Date: Mar. 3, 2005

(65) Prior Publication Data

US 2007/0201517 A1    Aug. 30, 2007

(30) Foreign Application Priority Data

Aug. 13, 2003 (DE) ................................ 103 37 151

(51) Int. Cl.
*B60J 9/00* (2006.01)
(52) U.S. Cl. ..................... 296/203.01; 296/205; 296/29
(58) Field of Classification Search ............ 296/203.01, 296/204, 205, 203.02, 203.03, 203.04, 29, 296/30

See application file for complete search history.

(56) References Cited

U.S. PATENT DOCUMENTS

| 5,332,281 A | 7/1994 | Janotik et al. ................ 296/209 |
| 6,123,378 A | 9/2000 | Teply et al. .................... 296/29 |
| 6,402,414 B1 | 6/2002 | Kanodia et al. |

FOREIGN PATENT DOCUMENTS

| DE | 40 40 946 C1 | 3/1992 |
| DE | 196 09 722 A1 | 9/1997 |
| DE | 196 53 509 A1 | 6/1998 |
| EP | 0 568 251 A1 | 11/1993 |
| FR | 2 785 972 A1 | 5/2000 |
| WO | WO 95/20081 A1 | 7/1995 |
| WO | WO 03/045767 A1 | 6/2003 |

*Primary Examiner*—Lori L Lyjak
(74) *Attorney, Agent, or Firm*—Proskauer Rose LLP

(57) ABSTRACT

The invention relates to a junction structure for connecting two profiles (1, 2), especially in a vehicle support frame. The first profile (1) has at least two planar, parallel sides and the second profile (2) comprises two parallel, opposite girders (3, 4) and at least one strip (5, 6) connecting the girders (3, 4). The girders (3, 4), with their lateral ends, project relative to the strip (5, 6), the projections forming paired, parallel flanges (31, 41, 32, 42). The junction structure is characterized in that the first profile (1) at the location of connection, is provided with a recess (7) into which the second profile (2) is inserted on the front side in such a manner that the parallel sides of the opposite ends (8, 9) of the first profile limiting the recess (7) rest in a form fit against the insides (31a, 41a, 32a, 42a) of the opposite flanges (31, 41, 32, 42) of the second profile (2) and are connected thereto.

10 Claims, 2 Drawing Sheets

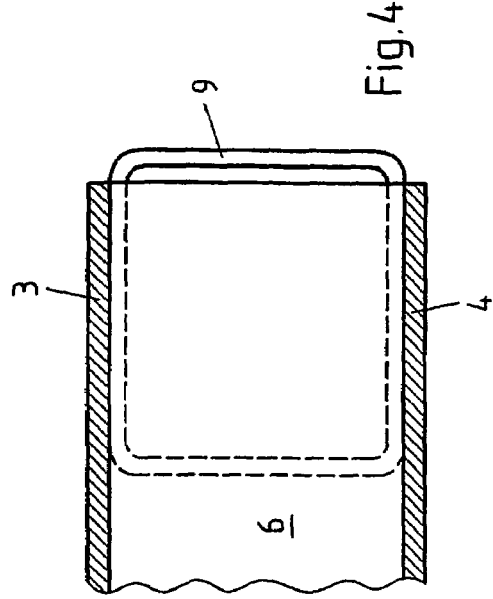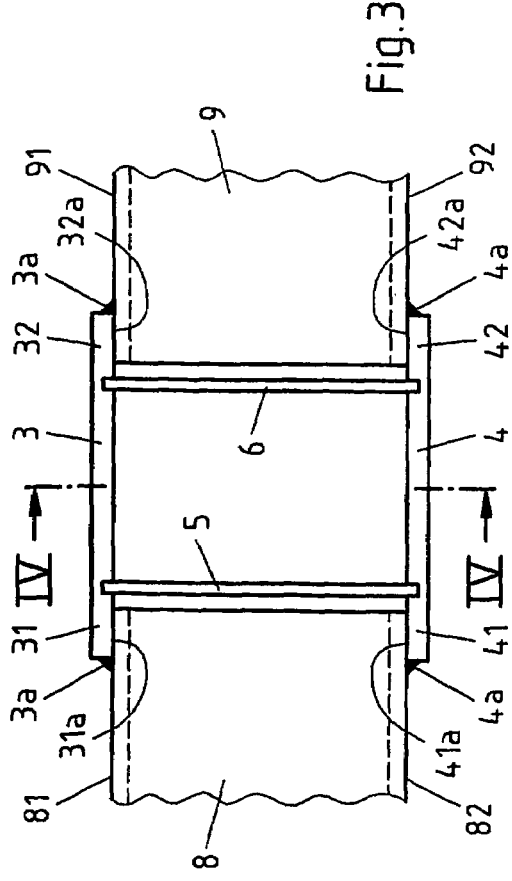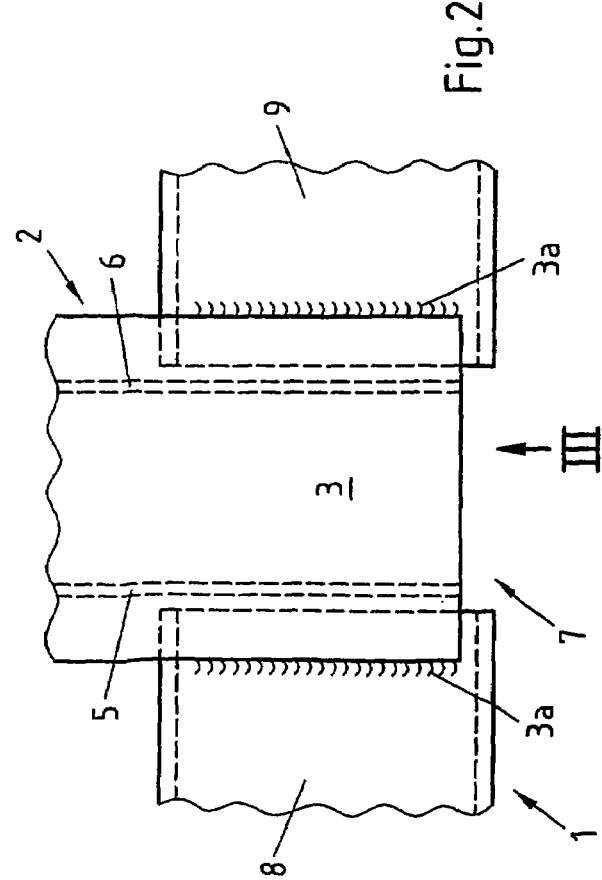

JUNCTION STRUCTURE FOR CONNECTING TWO PROFILES IN A VEHICLE SUPPORT FRAME

BACKGROUND

The invention relates to a junction structure for connecting two profiles, in particular in a vehicle support frame, the first profile of which has at least two planar, parallel sides and the second profile consists of two parallel, opposite girders and at least one strip, connecting the girders, whereby the girders with their lateral ends project relative to the strip, these projections forming paired parallel flanges, and whereby the first profile at the location of connection has a recess, into which the second profile is inserted on the front side in such a manner that the parallel sides of the opposite ends of the first profile limiting the recess, rest in a form fit against the insides of the opposite flanges of the second profile and are connected thereto.

For some years particularly in the construction of vehicles before the background of new lightweight construction concepts, hollow profiles, that is to say profiles with a closed cross section, are again increasingly being used. In particular such hollow profiles, which are produced from high and maximum strength steel materials, offer a high weight reduction potential. A central problem area in the use of hollow profiles concerns their joining together by means of connecting junctions.

Junction structures for connecting profiles, in particular hollow profiles, have been known for a long time. Thus European Patent EP 0 568 251 B1 describes a T-shaped junction structure for joining a cross member configured as a hollow profile with a rectangular cross section to the side rocker rail. In accordance with one embodiment of such a T-junction the cross member at its one end is split lengthwise and bent up so as to form two profiles with C-shaped cross section, arranged flush with one another, bent about 90° in each case, against which the side rocker rail is placed and welded thereto. As a result a junction structure with a large contact zone and high strength associated therewith can be realized, which in addition provides tolerance compensation in the vehicle longitudinal direction, however linked with this is the comparatively high production cost due to the respective need for individual working of the cross member end. Also, in the event of a front or rear collision, that is to say if force is applied to the vehicle frame in the longitudinal direction, the weld seam can tear, whereby the connection between cross member and side rocker rail is completely broken and the vehicle support frame to a large extent loses strength.

SUMMARY OF THE INVENTION

A junction structure in a vehicle support frame described in the German Patent DE 196 53 509 A1 is based on a junction element with at least two connection pieces produced from sheet steel by hydro-forming (IHU). The hollow profiles to be connected are attached to the connection pieces and fixed by means of welding or bonding. Although this permits precise connection of two or several profiles, whereby some degree of tolerance compensation is provided through a limited variable insertion depth, such a junction element can only be produced individually and as a result of the IHU technology is very costly.

Finally a junction structure for connecting two profiles in accordance with the preamble is known from practice, whereby the strip(s) of the second profile connecting the girders are cut lengthwise relative to the girders, so that the frontal projections of the girders resulting there from enclose the first profile connected at right angles in a form fit. This junction structure fixed by means of a weld join is likewise characterized by high strength. However under stress with thin wall thickness and at the same time large profile cross sections, curving effects and/or twisting of the first profile usually configured as a longitudinal member can ensue, whereby the strength of the junction structure is substantially reduced. Moreover the frontal trimming of the second profile means that this cannot be taken from continuous profile production due to the need for intermediate processing, which leads to increased cost. As an alternative to the additional trimming the second profile may also be produced individually, which however is likewise associated with high cost.

In the case of a known junction structure of the kind described at the beginning (WO 03/0457 A1) the first profile consists of two sections flush with one another, which are arranged at a distance from one another and thus form a "recess" in which the second profile is arranged. The two sections of the first profile are only connected together by means of the second profile. High strength particularly if the second profile is axially stressed in the direction of the recess is absent.

Therefore the object of the invention is to create a junction structure of the kind described at the beginning, which permits high-strength connection of the profiles, whereby tolerance compensation of the profiles should be provided, just as the possibility of using profiles directly from a continuous production process.

The object is achieved according to the invention with a junction structure in accordance with the preamble, whereby the first profile has a connecting strip in the vicinity of its recess on its side facing the front of the inserted second profile.

The junction structure according to the invention is simply configured and thus is to be produced without high production cost. It is particularly advantageous that the second profile can be taken directly from continuous production and only needs to be cut to length as required by the user. A junction structure with particularly high strength is created, since the second profile is inserted into a recess provided in the first profile in its sidewalls. The inserted section of the strip(s), if the first profile is longitudinally stressed acts as a bulkhead steel plate and thus reinforces the junction. As a result both a cross-sectional change of the profiles is suppressed when heavily stressed and their twisting in the vicinity of the junction is also effectively prevented. Tolerance compensation of the profiles is possible in two dimensions. This can be realized in the longitudinal direction of the first profile by a variation in the width of the recess as well as by a variation in the situation of the inserted second profile perpendicularly to the direction of insertion, so that the ends of the first profile are arranged at a different distance from the strip(s) of the second profile. On the other hand tolerance compensation can also be realized in the longitudinal direction of the second profile, that is to say, by a variation in the insertion depth of the second profile into the recess provided in the first profile. The junction structure is particularly effectively reinforced by the remaining connecting strip, even if the second profile is heavily stressed in its longitudinal direction, for example in the event of a side collision.

The connecting strip can be realized in various ways. According to a first embodiment at the location of the recess of the completely split first profile the one end of the first profile has a projection forming the connecting strip, by means of which this one end is connected to the other end of the first profile. This configuration can provide tolerance compensation in the longitudinal direction of the first profile. With another alternative embodiment of the junction structure according to the invention, it is proposed that the first profile is split at the location of the recess by forming the connecting strip as far as the side facing the front of the second profile. The first profile therefore in contrast to the embodiment described above has a continuous thread, as a result of which the fatigue resistance of the junction structure is increased.

In accordance with a further advantageous embodiment of the invention the second profile has two strips, the one of which is cut lengthwise.

Preferably the second profile is a DAVEX profile. DAVEX profiles for production reasons already have the necessary cross sectional geometry with the parallel flanges projecting laterally outwards. The thickness ratio between the girders and the strip(s) can be easily adjusted according to the load profile of the later application. In contrast to an extruded press section for example, DAVEX profiles can be produced problem-free from high-strength or maximum strength steel materials. In this case the use of different materials for the girders and the strip(s) respectively is also possible, so that the girders, possibly particularly loaded in operation, can be produced from a high-strength material, while the less loaded strips can be produced from a more economical material.

Expediently the profiles are joined by welding. As a tangible embodiment of this weld join a linear weld seam is particularly appropriate, as a result of which the outer edges of the parallel flanges of the second profile are connected to the sides of the first profile resting in a form fit. An elongated weld seam is achieved by such a linear weld join, which additionally contributes to the high strength of the junction structure.

The use of the junction structure according to the invention is particularly advantageous for connecting junctions of profile elements in a vehicle support frame. Expediently in this case the first profile is configured as a vehicle longitudinal member, in particular as a rear vehicle longitudinal member, and the second profile as a vehicle cross member. The girders of the second profile with their flanges pointing outwards offer a suitable contact surface for components of the vehicle floor, for example.

In the event of a rear collision, during which heavy force is applied on the front side to the rear longitudinal member, the junction does not lose its stability due to the strips projecting into the first profile and sealing off the profile ends, even if tearing of the weld seams occurs.

Apart from use in the support frame of motor cars the junction structure according to the invention is also particularly suitable for use in buses, commercial and rail-mounted vehicles, since these generally have a ladder frame as a basic structure.

If the second profile concerns a DAVEX profile, this is particularly suitable as a vehicle seating support, that is to say as cross member on which vehicle seats—in a motor car or a bus—can be bolted. Here the fact that a load, acting perpendicularly on the girder surface, through a person sitting in the vehicle for example, can be absorbed especially well by the DAVEX profile is exploited.

In detail with this configuration having two strips preferably selected particularly for DAVEX profiles, the one strip is cut lengthwise to such an extent that the recess in the first profile can be selected substantially smaller and thus the opposite ends of the first profile are supported at a substantially shorter distance from one another. Although this is linked with greater weight of the junction structure and an additional work process (trimming) during the preparation of the second profile, the strength of the junction structure can be substantially increased further. Therefore this embodiment is particularly suitable in applications, which are less weight sensitive, but instead all the more associated with permanently high stresses, for example in the commercial or rail-mounted vehicle field.

Finally the high strength of the junction structure according to the invention, in particular its torsion rigidity, can be increased still further as a result of it being additionally enclosed with shell-type elements, which can be configured as deep-drawn or edge components.

The invention is explained below in detail with reference to a drawing illustrating exemplary embodiments, wherein there is shown:

DETAILED DESCRIPTION OF THE DRAWINGS

Figure 1:
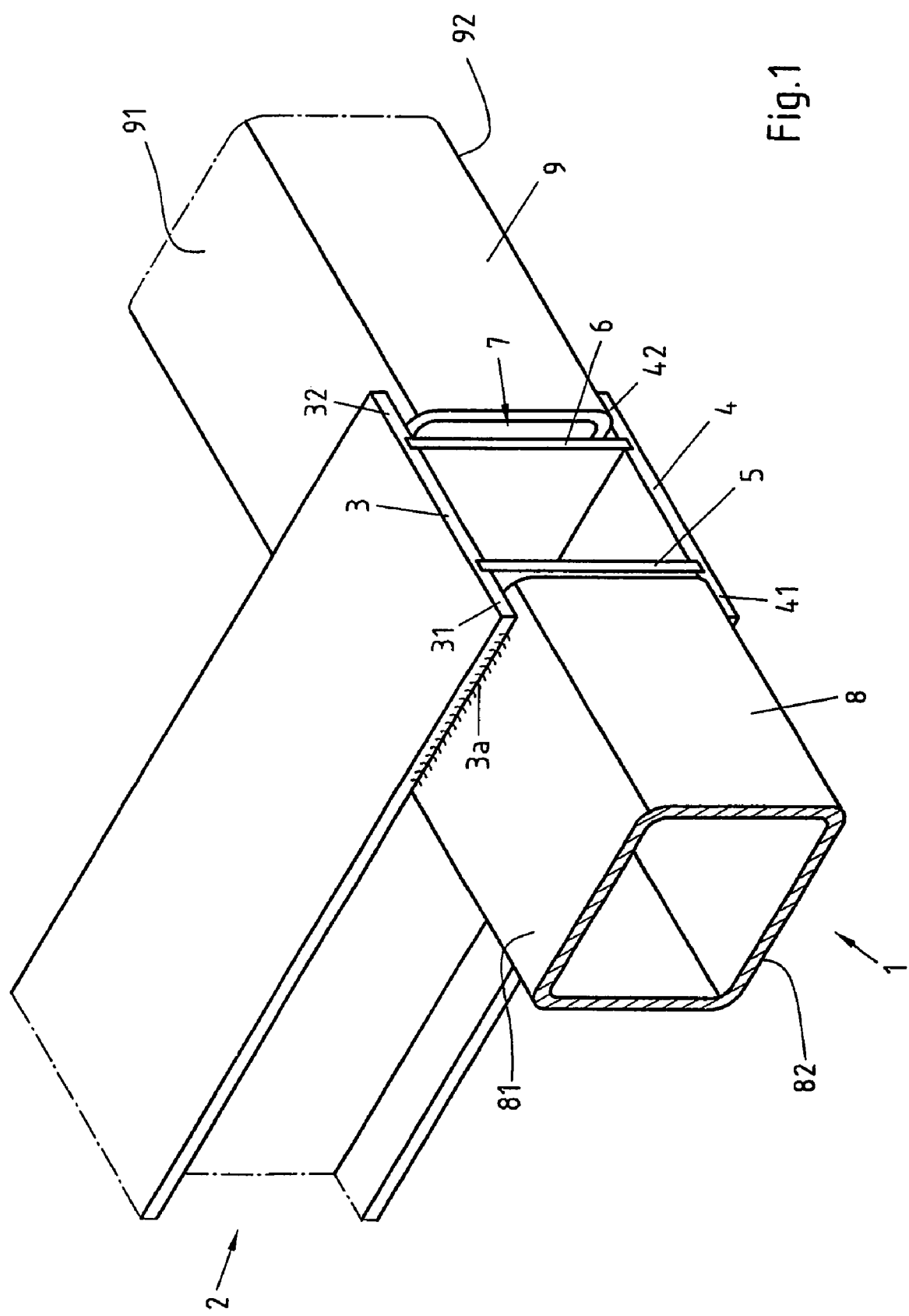
FIG. 1 a junction structure for connecting two profiles, whereby the first profile is split as far as a connecting strip, in perspective view, FIG. 2 the junction structure of FIG. 1 in a modified version, whereby the profile is completely split, in perspective view, FIG. 3 the junction structure of FIG. 1 in a further modified version with trimmed second profile in plan view, FIG. 4 the junction structure of FIG. 3 in the side section along line I-I of FIG. 3.

The junction structure illustrated in FIG. 1 consists of a first profile 1, which is configured as a hollow profile with a rectangular cross section, and a second profile 2, which consists of two parallel, opposite girders 3, 4 and two likewise parallel aligned strips 5, 6, connecting the girders 3, 4, whereby the girders 3, 4 with their lateral ends project relative to the strip(s) 5, 6, these projections forming paired parallel flanges 31, 42, 32, 42. The second profile 2 preferably concerns a DAVEX profile, in which the cross-sectional shape described is already present as a result of the production process. The first profile 1 is split along its total length as far as one side, so that two opposite profile ends 8, 9, which limit a recess 7, are present and are connected to one another only by means of a connecting strip 10. Into this recess 7 the second profile 2 is inserted in such a manner that the upper and lower surfaces 81, 91, 82, 92 respectively of the profile ends 8, 9 rest in a form fit against the insides 31a, 41a, 32a, 42a of the opposite flanges 31, 41, 32, 42 of the second profile 2. On the outer edge of the flanges 31, 41, 32, 42 the second profile 2 is rigidly connected by a total of four weld seams 3a, 4a, which are configured as linear weld seams, to the profile ends 8, 9 of the first profile 17, as a result of which a simply configured, high-strength junction structure with the strips 5, 6 acting as bulkheads for the profile 1 is formed.

As part of a vehicle support frame, whereby the first profile 1 forms a rear longitudinal member and the second profile 2 a cross member for example, the junction structure according to the invention is characterized by very good crash properties. If due to a rear collision very heavy force is applied in the longitudinal direction to the first profile 1 forming the longitudinal member for example, the junction structure does not lose its stability, even though the linear weld seams 3a, 4a tear, since the profile ends 8, 9 are inhibited from moving longitudinally by the strips 5, 6 of the inserted second profile 2 acting as bulkheads and collapsing, that is to say a major cross-sectional change, of the profile ends 8, 9 as well as their excessive torsion is prevented at the location of the junction structure through the flanges formed by the girders 3, 4.

With the embodiment of the junction structure illustrated in FIG. 1 the first profile 1 is not completely split at the location of connection, but only as far as the side facing the front of the second profile 2 which forms a connecting strip 10. This profile 1 thus has a continuous thread, as a result of which the fatigue resistance of the junction structure is increased. If the second profile 2 is heavily stressed in the longitudinal direction, the connecting strip 10 acts as barrier, which effectively prevents the second profile 2 being pushed through the recess 7 of the first profile 1, in the event of crash-induced tearing of the weld seams 3a, 4a, for example.

With the embodiment of the junction structure illustrated in FIG. 2 the one profile end 9, on the side turned away from the second profile 2, has a projection, forming a connecting strip 10, by which it is connected to the other profile end 8 and thus forms a connecting strip 10. The connection is again configured as linear weld seam 10a. As a result of this configuration the junction structure is additionally reinforced if the second profile 2 is stressed in its longitudinal direction, in the event of a side collision for example.

With the embodiment of the junction structure according to the invention illustrated in FIGS. 3 and 4 the one strip 6 of the second profile 2 is cut lengthwise in such a manner that the recess in the first profile 1 can be selected substantially smaller and thus the profile ends 8, 9 lie at a substantially shorter distance from one another. Although linked with a greater weight of the junction structure as well as with a higher production cost, this makes for a significant increase in the strength of the junction structure.

The invention claimed is:

1. Junction structure for connecting two profiles,
   wherein a first profile has at least two planar, parallel sides and a second profile includes two parallel, opposite girders and at least one strip connecting the girders,
   wherein the girders with their lateral ends project relative to the at least one strip, these projections forming paired parallel flanges,
   wherein the first profile at a location of connection has a recess into which the second profile is inserted on a front side such that parallel sides of opposite ends of the first profile limiting the recess rest in a form fit against insides of opposite flanges of the second profile and are connected thereto, and
   wherein the first profile has a connecting projection in a vicinity of the recess on a side facing the front side of the inserted second profile.

2. Junction structure according to claim 1, wherein the first profile while forming the connecting projection is split at a location of the recess as far as a side facing the front side of the inserted second profile.

3. Junction structure according to claim 1, wherein the first profile is completely split at the location of the recess, and one end of the first profile has a projection forming the connection projection, by which this one end is connected to the other end of the first profile.

4. Junction structure according to claim 1, wherein the second profile has two strips, wherein one of the two strips is cut lengthwise.

5. Junction structure according to claim 1, wherein the first and second profiles are joined together by welding.

6. Junction structure according to claim 5, wherein weld join is configured as a linear weld seam.

7. Junction structure according to claim 1, wherein the second profile is a profile comprising two parallel aligned strips and two parallel, opposite girders, whereby lateral ends of the girders project relative to the strips, the projections forming parallel flanges.

8. Junction structure according to claim 2, wherein the second profile is configured as a vehicle seating support.

9. Junction structure according to claim 1, wherein the junction structure is additionally enclosed with shell-type elements.

10. Junction structure according to claim 9, wherein the shell-type elements are configured as deep-drawn or edge components.

* * * * *